United States Patent
Prelewicz et al.

(10) Patent No.: US 12,415,159 B2
(45) Date of Patent: Sep. 16, 2025

(54) NUCLEAR DRIVEN CARBON DIOXIDE SEQUESTRATION SYSTEM AND METHOD

(71) Applicant: Information Systems Laboratories, Inc., La Jolla, CA (US)

(72) Inventors: Daniel A. Prelewicz, Jefferson, MD (US); Joseph R. Guerci, La Jolla, CA (US); Jason G. Williams, Ambler, PA (US)

(73) Assignee: Information Systems Laboratories, Inc., La Jolla, CA (US)

( * ) Notice: Subject to any disclaimer, the term of this patent is extended or adjusted under 35 U.S.C. 154(b) by 1431 days.

(21) Appl. No.: 16/995,528

(22) Filed: Aug. 17, 2020

(65) Prior Publication Data

US 2021/0053013 A1 Feb. 25, 2021

Related U.S. Application Data

(60) Provisional application No. 62/889,936, filed on Aug. 21, 2019.

(51) Int. Cl.
*B01D 53/78* (2006.01)
*B01D 53/14* (2006.01)
(Continued)

(52) U.S. Cl.
CPC ......... *B01D 53/78* (2013.01); *B01D 53/1425* (2013.01); *B01D 53/1475* (2013.01); *B01D 53/1493* (2013.01); *B01D 53/18* (2013.01); *B01D 53/62* (2013.01); *B01D 53/96* (2013.01); *B01J 21/063* (2013.01); *B01J 23/04* (2013.01); *B01J 23/42* (2013.01); *B01J 23/462* (2013.01);
(Continued)

(58) Field of Classification Search
CPC ........ B01D 53/14; B01D 53/18; B01D 53/62; B01D 53/78; B01D 53/96; B01J 21/06; B01J 23/04; B01J 23/42; B01J 23/46; B01J 23/52; B01J 23/72; C01F 11/18; G21D 3/08; G21D 9/00
See application file for complete search history.

(56) References Cited

U.S. PATENT DOCUMENTS

2010/0260307 A1* 10/2010 Hyde .................. G21C 1/026
376/299

FOREIGN PATENT DOCUMENTS

FR 3128813 A1 * 5/2023 ............... G21D 5/08

OTHER PUBLICATIONS

Fr document (Year: 2021).*

* cited by examiner

Primary Examiner — Sharon Pregler
(74) Attorney, Agent, or Firm — Clark Hill PLC

(57) ABSTRACT

A system and method for heat produced at a nuclear power plant as the energy source for carbon dioxide sequestration while simultaneously producing electricity. The system includes a nuclear power plant that differs significantly from conventional designs inasmuch as its design is tightly integrated into the carbon dioxide sequestration system. The system generates electricity and sequesters carbon dioxide at the same time. Instead of simply generating electricity from the nuclear reactor and then using that electricity to run a sequestration process, the method is designed to directly provide the requisite thermal energy to the sequestration process, and simultaneously power an electrical generator. Another feature of the system design is a method of optimizing load balancing between the electrical grid and carbon dioxide sequestration.

21 Claims, 6 Drawing Sheets

(51) Int. Cl.
- *B01D 53/18* (2006.01)
- *B01D 53/62* (2006.01)
- *B01D 53/96* (2006.01)
- *B01J 21/06* (2006.01)
- *B01J 23/04* (2006.01)
- *B01J 23/42* (2006.01)
- *B01J 23/46* (2006.01)
- *B01J 23/52* (2006.01)
- *B01J 23/72* (2006.01)
- *C01F 11/18* (2006.01)
- *G21D 3/08* (2006.01)
- *G21D 9/00* (2006.01)

(52) U.S. Cl.
CPC ............... *B01J 23/52* (2013.01); *B01J 23/72* (2013.01); *C01F 11/18* (2013.01); *G21D 3/08* (2013.01); *G21D 9/00* (2013.01); *B01D 2251/304* (2013.01); *B01D 2251/604* (2013.01); *B01D 2257/504* (2013.01); *B01D 2258/06* (2013.01)

NUCLEAR DRIVEN CARBON DIOXIDE SEQUESTRATION SYSTEM AND METHOD

FIELD OF THE INVENTION

The present invention generally relates to atmospheric carbon dioxide reduction. More specifically, the present invention relates to sequestration of carbon dioxide using heat from a non-hydrocarbon power source, such as a nuclear reactor, while simultaneously producing electricity.

BACKGROUND OF THE INVENTION

Increasing concentrations of greenhouse gases in the Earth's atmosphere has been a growing concern for decades. One of the most recognized greenhouse gasses is carbon dioxide ($CO_2$), which is a byproduct of combustion of hydrocarbon fuels. Simply limiting the amount of carbon dioxide produced through combustion is not sufficient to reduce the concentration of carbon dioxide in the atmosphere, so removal of carbon dioxide is a viable strategy.

Removing carbon dioxide from the atmosphere, such as through a process of carbon sequestration, poses several logistical challenges and will require a substantial amount of energy. However, many power sources produce energy by using hydrocarbons and, thus, produce carbon dioxide in the first place, which defeats or severely limits the usefulness of hydrocarbon-driven carbon reduction systems in reducing carbon dioxide levels in the atmosphere.

Further, existing thermally driven carbon sequestration processes require electricity to produce the thermal power, which means that energy from a fuel source has to be converted to electricity before being converted into thermal energy to drive the sequestration process.

Nuclear reactors are an example of a carbon neutral technology that release thermal energy on a large scale. Nuclear reactors already release large quantities of heat that can be converted to electrical power. Commercial nuclear power plants perform best at full power operation. Varying the output of a nuclear reactor is only reluctantly performed since nuclear reactors ideally operate at their design capacity, and deviations from that operating level can increase the cost of wear and tear and maintenance.

This presents operating issues when demand for electrical power varies throughout the day, which has been compounded by the advent of renewable, but highly variable electrical supply, being attached to the electric grid, such as, solar, wind, and tidal power generation sources. In many instances, it is not uncommon to discard excess power from a nuclear reactor as an alternative to changing the power output of the nuclear reactor.

A shortcoming of most large-scale electrical power generation systems is that they add carbon to the atmosphere, with the exception of hydroelectric facilities.

A shortcoming of nuclear power plants as they exist at the present time is that they dump some generated electricity to compensate for variable electricity demands.

Another shortcoming of nuclear power plants is that, while carbon neutral, they do not reduce the overall amount of carbon in the atmosphere.

A shortcoming of existing carbon sequestration systems is that they require, directly or indirectly, carbon to be released in order to obtain the electrical power required to perform carbon sequestration. Another shortcoming of existing carbon sequestration systems is the inefficient conversion of fossil or alternative fuels into electricity to drive the carbon sequestration process.

Therefore, there exists a heretofore unmet need for a nuclear-based carbon sequestration system (NuCO) that reduces atmospheric carbon while reducing energy waste by the nuclear reactor and improves efficiency of the energy transmitted to drive the carbon sequestration process. There is also a need for a system of operating a nuclear reactor that compensates for variable electrical demand on the electrical grid and reduces the amount of electricity that must be dumped to ground.

SUMMARY OF THE DISCLOSURE

The present invention is a system and method for reducing atmospheric carbon dioxide concentration. Specifically, sequestering carbon dioxide from the atmosphere using heat and electricity from a non-hydrocarbon power source.

One embodiment of the present disclosure is a nuclear powered carbon sequestration system including a thermal source; a heat controller thermally coupled to the thermal source; a heat driven electrical generator coupled to the heat controller; and a carbon dioxide sequestration system coupled to the heat controller, where the heat controller allocates energy from the thermal source between the heat driven electrical generator and the carbon dioxide sequestration system. The carbon dioxide sequestration system may include a carbon dioxide capture apparatus; a circulation loop for moving a capture solution that is in fluid communication with the carbon dioxide capture apparatus; a first chemical reactor in fluid communication with the circulation loop; a sequestration feedstock supply in fluid communication with the first chemical reactor; a second chemical reactor in fluid communication with the first chemical reactor; a first set of thermal energy piping configured to transport thermal energy from the heat controller to the second chemical reactor; a residual tank connected to the second chemical reactor; a third chemical reactor in fluid communication with the second chemical reactor; a product feedstock tank in fluid communication with the third chemical reactor; and a second set of thermal energy piping configured to transport thermal energy from the heat controller to the third chemical reactor. The capture solution may be selected to react with carbon dioxide and produce a capture reaction product that comprises carbon from the carbon dioxide, such as sodium hydroxide. The sequestration feedstock supply may include calcium hydroxide. The product feedstock supply may include silicon dioxide. A thermocatalyst supply and/or a substrate supply may be in fluid communication with the second and/or third chemical reactor. The thermocatalyst supply and/or the substrate supply may differ between the second and third reaction chambers. The thermocatalyst supplies may include one or more of: a metal, a multi-metal catalyst complex, a metal oxide, an aluminosilicate, and a liquid metal. The thermocatalyst supply may include one or more of: platinum, copper, rubidium, gold, titanium and ruthenium. The substrate supply may include one of more of: single atoms of nickel, cobalt, and iron supported on carbon nanotubes, liquid metal with cerium nanoparticles, Ru-Macho-BH, palladium, or palladium to copper nanoparticles. An ultraviolet light source may be connected to the third chemical reactor. A makeup capture solution supply may be connected to the first chemical reactor. The system may include a heat divider apparatus disposed between the heat controller, the first set of thermal energy piping, and the second set of thermal energy piping, wherein the heat divider is configured to allocate the thermal energy from the heat controller between the first set of thermal energy piping and the second set of thermal energy piping. The carbon dioxide sequestration system may include one or more fans or pumps to move atmospheric air into the carbon dioxide capture apparatus. The electrical generator may have an output in communication with an electric grid and include an electrical controller electrically coupled to the electrical generator and configured to provide electricity demand feedback to the heat controller, wherein the heat controller is configured to allocate the thermal energy from the thermal source based, at least in part, on the electricity demand feedback. The electrical generator may include an electrical controller electrically coupled to the electrical generator and configured to allocate a portion of the output to an operation reserve and to provide information on the demand load to the heat controller, wherein the heat controller is configured to allocate the thermal energy from the thermal source based, at least in part, on the demand load; and a reserve controller configured to divert at least a portion of the operating reserve to at least one electric heater in the carbon dioxide sequestration system, wherein the at least one electric heater is in thermal communication with at least one of the second chemical reactor and the third chemical reactor. The thermal source may be a nuclear reactor, and the thermal source may be configured to output thermal energy at 600 degrees Celsius or higher. There may be a plant valve disposed between the thermal source and the heat controller and configured to regulate thermal energy into the heat controller.

Another embodiment of the present disclosure is a method of producing a carbon containing product using sequestered carbon dioxide, the method including the steps of: forming a carbon containing reaction product by combining a capture solution with atmospheric carbon dioxide; forming a carbon containing sequestration reaction product by combining the carbon containing reaction product with a sequestration feedstock; providing thermal energy from a nuclear reactor to break down the carbon containing sequestration reaction product, where the carbon sequestration feedstock is broken down into a non-carbon residual product and at least one of carbon dioxide and carbon monoxide; and synthesizing a sequestered carbon product using additional thermal energy from the nuclear reactor to heat a product feedstock and at least one of carbon dioxide and carbon monoxide. The method may also include one or more of the steps of: reforming the sequestration feedstock from the non-carbon residual product; using a first thermocatalyst with the sequestration feedstock product; and using a first substrate with the sequestration feedstock product. The first thermocatalyst may be one or more of: a metal, a multi-metal catalyst complex, a metal oxide, an aluminosilicate, and a liquid metal. The first thermocatalyst may be one or more of: platinum, copper, rubidium, gold, titanium and ruthenium. The first substrate may include one or more of: single atoms of nickel, cobalt, and iron supported on carbon nanotubes, liquid metal with cerium nanoparticles, Ru-Macho-BH, palladium, or palladium to copper nanoparticles. The method may include one or more of the steps of: using a second thermocatalyst with the product feedstock and the at least one of carbon dioxide and carbon monoxide; and using a second substrate with the product feedstock and the at least one of carbon dioxide and carbon monoxide. The second thermocatalyst may be one or more of: a metal, a multi-metal catalyst complex, a metal oxide, an aluminosilicate, and a liquid metal. The second thermocatalyst may be one or more of: platinum, copper, rubidium, gold, titanium and ruthenium. The second substrate may include one or more of: single atoms of nickel, cobalt, and iron supported on carbon nanotubes, liquid metal with cerium nanoparticles, Ru-Macho-BH, palladium, or palladium to copper nanoparticles. The method may further include the step of: destabilizing chemical bonds of the at least one of carbon dioxide and carbon monoxide. The capture solution may be selected to react with carbon dioxide and produce a capture reaction product that comprises carbon from the carbon dioxide, such as sodium hydroxide. The sequestration feedstock may be calcium hydroxide. The product feedstock may be silicon dioxide.

Another embodiment of the present disclosure is a method of regulating electrical output of a nuclear power plant, including the steps of: responding to a rapid change in the demand load by reallocating power from the electrical generator between the demand load and an operating reserve using an electrical controller; and using electrical power from the operating reserve to operate an electric heater in a carbon dioxide sequestration system.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

The organization and manner of the structure and operation of the invention, together with further objects and advantages thereof, may best be understood by reference to the following description taken in connection with the accompanying drawings wherein like reference numerals identify like elements in which.

DETAILED DESCRIPTION OF THE DISCLOSURE

Figure 1:
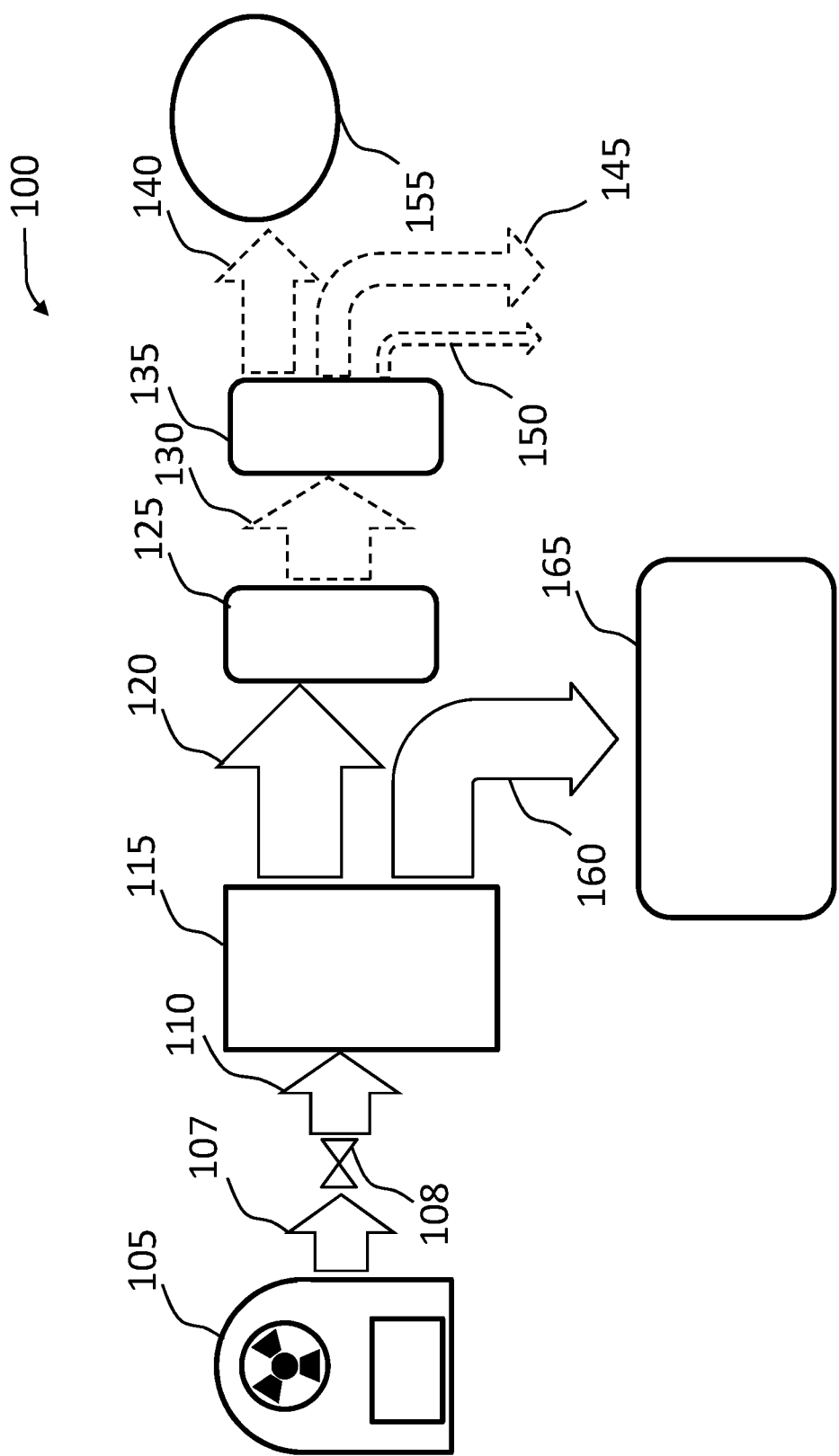
FIG. 1 is a diagram of a nuclear driven carbon dioxide sequestration system according to one embodiment of the present disclosure.

While this invention may be susceptible to embodiment in different forms, specific embodiments are shown in the drawings and will be described herein in detail with the understanding that the present disclosure is to be considered an exemplification of the principles of the invention and is not intended to limit the invention to that as illustrated.

Nuclear power plants can be used to provide thermal energy for driving carbon sequestration processes that reduce the overall carbon dioxide concentration in the atmosphere. In some aspects, the carbon removed from the atmosphere may be used to produce useful products.

While nuclear power plants are stable sources of thermal energy, advanced nuclear power plants are designed to provide high temperature (600 degrees Celsius and above) thermal energy outputs, which can be used effectively to drive high temperature chemical reactions and thermocatalytic processes. Exemplary advanced nuclear power plants may include those containing high temperature gas nuclear reactors, liquid metal reactors, fusion reactors or molten salt nuclear reactors.

This ready supply of high temperature heat means that some nuclear power plants can thermally drive carbon sequestration instead of relying solely on sequestration processes driven by electricity. In fact, in aspects, a nuclear power plant, with the benefit of this disclosure, may be configured to generate electricity while using a portion of its thermal output to drive carbon sequestration, making the overall power production process carbon negative.

Herein, structures and power flows/streams of heat and electricity may be described interchangeably, thus, a thermal energy flow will also have associated structures such as valves and conduits to facilitate its path. Likewise, electrical paths indicate the direction of electrical power and also represent the structures that convey the electrical power, such as wires and switches, as would be understood by a person of skill in the art.

FIG. 1 shows a diagram of a nuclear reactor-based carbon dioxide sequestration system 100. The system 100 includes a high temperature thermal power source 105, such as nuclear fission or fusion reactor. Nuclear reactors produce large amounts of thermal energy released from the fission or fusion of nuclear materials. The thermal energy 107 may be carried away from the nuclear reactor 105 via heat conveying pipes or other suitable conduits so that the usable thermal energy 110 may be converted into electrical power or used to drive a carbon sequestration process. In some embodiments, a plant valve 108 (which may include one or more valves and associated electronic controls and actuators) may be disposed between the thermal energy flow 107 and the usable thermal energy flow 110. After exiting the plant valve 108, the usable thermal energy 110 may be carried away from the plant valve 108 in the form of a heated fluid carried by pipes or other conduits.

The quality of thermal energy available from the thermal power source 105 may be measured in terms of temperature and fluid flow rate, as a large quantity of thermal energy at low temperatures may not be sufficient to drive high temperature chemical reactions. A suitable nuclear reactor 105 may be one designed to have a high temperature output of 600 degrees Celsius or higher. In some embodiments, the output temperature of the nuclear reactor 105 may be above 800 degrees Celsius. Generally, higher output temperatures may be used to produce carbon products at faster rates or that cannot be synthesized at lower temperatures.

The usable thermal energy 110 may be controlled by a heat controller 115 configured to regulate the amount of the thermal energy flow that is used for electricity generation 120 and the amount of thermal energy flow used for carbon dioxide sequestration 160. The thermal energy flows 120, 160 include the valves and piping required to conduct thermal energy via heated fluids as would be understood by persons of skill in the art. The heat controller 115 may include a set of valves, piping, actuators, and/or electrical/electromechanical controls to control the transmission of a heated fluid that is moving from the thermal source 105, as would be understood by a person of ordinary skill in the art. The thermal energy directed to electricity generation 120 powers an electrical generator 125, such as a steam or gas turbine, to produce electricity. In some embodiments, the electrical generator 125 may be a set of two or more electrical generators. The thermal energy 120 may be transmitted to the electrical generator 125 in the form of a heated fluid carried by pipes or other conduits. The heat controller 115 may be configured to modulate the usable heat output between the demands of the electrical grid 155 and the carbon dioxide sequestration system 165. Thus, as demand for electricity declines, more thermal energy can be sent to the carbon dioxide sequestration system 165, as thermal energy to the electrical generator 125 is reduced. Likewise, as electricity demand increases, the heat controller 115 may reallocate thermal energy to the electrical generator 125 while reducing the amount of thermal energy sent to the carbon dioxide sequestration system 165. This way the heat controller 115 may be used to avoid or reduce the need for the power level of the nuclear reactor 105 being adjusted to follow the electrical load demand 140. Even if the power level of the nuclear reactor 105 can be adjusted easily, it may not be prudent to do so due to the slow response time, thermal stress, equipment stress, etc., which lead to increased maintenance costs and, potentially, reduced equipment service lifetime.

In some embodiments, the heat controller 115 may include one or more valves that modulate the usable heat output to meet the electricity demand while directing the excess heat 160 not needed for electricity generation to the carbon dioxide sequestration system 165. The plant valve 108 can be used to control the amount of the heated fluid flow 107 that enters the heat controller 115 as the flow of thermal energy 110, and, thus, can be used as backup to the heat controller 115 under selected conditions, such as when the heat controller 115 is offline or out of service.

In some embodiments, the plant valve 108 may operate based, in part, on a control signal indicative of electricity demand (i.e. from the electrical generator 125). The plant valve 108 may include a controller to receive and process the control signal, and said controller may include a dead band for the electricity demand input so that no action (valve movement) would be taken until the electricity demand exited the dead band. With this configuration the heated fluid flow 110 would be modulated by the heat controller 115 to assure that sufficient usable heated fluid 120 was directed to the turbine generator 125 to meet the current electricity demand, and that the excess heated fluid was sent to the carbon dioxide sequestration system 165. The plant valve 108 would remain at the full power position so that the nuclear reactor 105 continues to operate at full power with no need to load follow. In some embodiments, the dead band may be based, at least in part, on the historical demand load placed on the electrical generator 125.

The electrical generator output energy 130 is transmitted to an electrical controller 135 that apportions the output to satisfy the electrical grid demand load 140, an operating reserve 145, and a house load 150. The electrical grid demand load electricity 140 is sent to the electrical grid 155.

In some embodiments, the house load 150 powers both the nuclear plant internal electricity loads and the carbon dioxide sequestration system loads. Typically, the house electrical load 150, remains fairly constant when the plant and the sequestration system are in full operation. The operating reserve electricity 145 (also called the spinning reserve) can be zero or dumped to ground. While the heat controller 115 can make adjustments to the amount of input thermal energy sent to the electrical generator 125 to compensate for electricity demand fluctuations, the electrical controller 135 may respond much more rapidly to demand fluctuations by reallocating electricity between the demand load 140, the operating reserve 145, and the house load 150, including dumping electricity to ground when the electricity is not needed for the carbon dioxide sequestration system 165. While it is expected that the electricity directed to the operating reserve 145 will rarely be dumped to ground, this capability is provided to assure maximum flexibility in controlling the overall production process.

Thermal energy used for carbon dioxide sequestration 160 may be directed to the carbon dioxide sequestration system 165. Like the thermal energy 120, the thermal energy 160 may be transmitted in the form of a fluid carried by pipes or other conduits, as would be understood by a person of skill in the art.

The temperature of the thermal energy 160 may be 600 degrees Celsius or higher, and, in some instances, exceed 800 degrees Celsius. Advanced nuclear reactors are designed to provide high temperature (600 degrees Celsius and above) thermal energy outputs, which can be used effectively to drive high temperature chemical reactions and thermocatalytic processes. While ideally suited to these advanced reactors, the heat output from existing nuclear reactors could also be used as input for the sequestration process; however, the carbon products produced would be of a more limited extent and value.

The temperature of the thermal energy 120, 160 depend on the temperature of the usable heat 110, which depends on the design and operation of the thermal source 105. In some embodiments, where the thermal source 105 is a nuclear reactor, advanced nuclear reactor designs may be used due to their higher temperature usable heat outputs, such as high temperature gas reactors, molten salt reactors, liquid metal reactors, and fusion reactors.

In some embodiments, the carbon dioxide sequestration system 165, and at least part of the components for transmitting the thermal energy 160 may be located near, but not within the plant exclusion area of the nuclear reactor 105, or other power plant facilities. By locating the carbon dioxide sequestration system 165 physically apart from the nuclear reactor 105, the cost and time associated with equipment certification, maintenance, inspections, and downtime may be reduced.

The carbon dioxide sequestration system 165 is configured to capture carbon dioxide from the atmosphere so that the carbon can be isolated. In some embodiments, carbon from the carbon dioxide may be used in the manufacture of useful products. While the sequestration system 165 may be driven largely by excess thermal energy, the system 100 may be configured such that there is normally some thermal energy 160 at all times such that the sequestration system 165 is always maintained at operating temperature.

Figure 2:
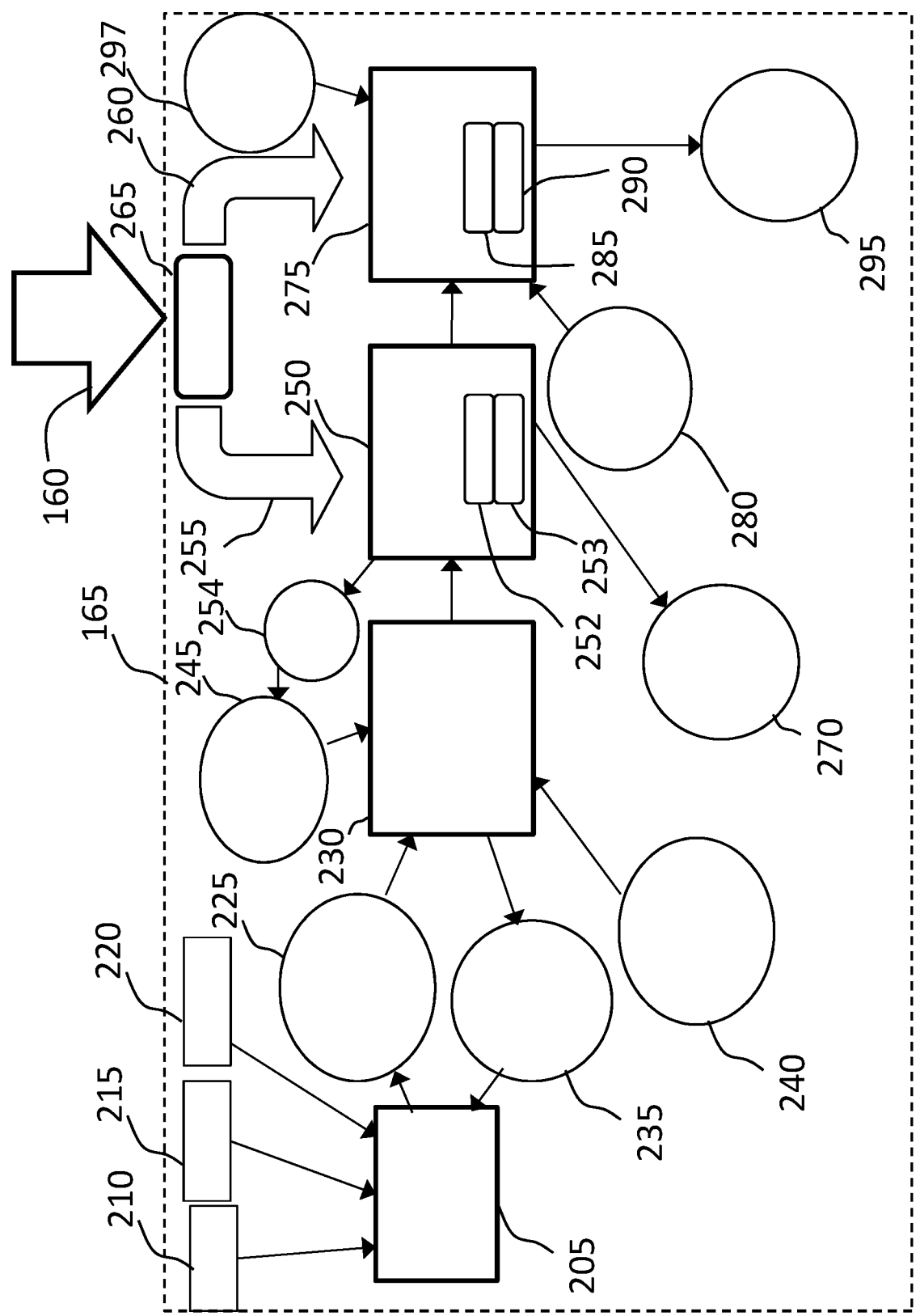
FIG. 2 is a diagram of the carbon dioxide sequestration system of FIG. 1.

FIG. 2 shows a diagram of the carbon dioxide sequestration system 165 according to one embodiment of the present disclosure. The carbon dioxide sequestration system 165 includes a carbon dioxide capture apparatus 205. The carbon dioxide capture apparatus 205 is configured to receive carbon dioxide laden air from the atmosphere and to output air containing a reduced amount of carbon dioxide. The air from the atmosphere may be channeled or forced into the carbon dioxide capture apparatus 205 using one or more of pumps 220 and/or fans 210. The carbon dioxide capture apparatus 205 is configured to provide a surface area between the atmospheric air and the capture solution 235 such that the carbon dioxide laden air flows across or through said capture solution 235 and has the opportunity to react with the capture solution 235. In some embodiments, the carbon dioxide capture apparatus 205 may be configured to maximize the surface area available for reactions between the carbon dioxide and the capture solution 235. A portion or all of the surface area may include thin films, wetted screens, or other devices known to those of skill in the art to increase the surface area available for the capture solution 235 to absorb the carbon dioxide from the air.

The capture solution 235 may be, but is not limited to, sodium hydroxide (NaOH) or other suitable chemical sorbents that absorbs and reacts with carbon dioxide. Carbon dioxide ($CO_2$) is absorbed by the NaOH solution and reacts to form a capture reaction product that contains the carbon dioxide, such as sodium carbonate. Air bubbling through the capture solution from spargers or similar devices, and also spray nozzles designed to eject small droplets may also be used to provide the maximum capture solution surface area. The carbon dioxide capture apparatus 205 may be connected to an inlet of the first chemical reactor 230 where the capture reaction product 225 flows into the first chemical reactor 230. The incoming fluid containing the capture reaction product reacts with a sequestration feedstock 245 to produce a sequestration reaction product that includes the carbon atoms from the carbon dioxide. Where calcium hydroxide is the sequestration feedstock 245, calcium carbonate is the sequestration reaction product that results from the chemical reaction, which also yields sodium hydroxide to be recycled back to the carbon dioxide capture apparatus 205. An outlet line is connected to the first chemical reactor 230 that allows the flow of the capture solution 235 back to the carbon dioxide capture hardware 205 once the reaction in the first chemical reactor 230 is completed. The pumps 220 may circulate the capture solution to and from the carbon dioxide capture hardware 205 and the first chemical reactor 230. Since the chemical reaction between the capture reaction product and the sequestration feedstock may be exothermic, coolers 215 may be required to maintain the desired temperature of the capture solution 235 and first chemical reactor 230. While the coolers 215 are shown disposed at the carbon dioxide capture apparatus 205, this is illustrative and exemplary only. The coolers 215 may alternatively or additionally be disposed along the circulation loop 225, 235 for the capture solution or at the first chemical reactor 230.

The first chemical reactor 230 may be in fluid or flow communication with a sequestration feedstock supply 245 and an optional capture solution supply 240. The optional capture solution supply 240 may be used to make up losses in the amount of capture solution cycling between the first chemical reactor 230 and the carbon dioxide capture apparatus 205. The sequestration feedstock supply may include a chemical compound that, when combined with the capture reaction product 225, initiates a chemical reaction that will restore the capture solution 235 to its original composition while the sequestration feedstock 245 binds with the carbon dioxide to form a sequestration reaction product. When calcium hydroxide is the feedstock and sodium hydroxide is the capture solution, the sequestration reaction product will be calcium carbonate, a solid substance that can be sequestered. In some embodiments, the first chemical reactor 230 may be a pellet reactor. The first chemical reactor 230 may be in communication with a second chemical reactor 250 such that the capture reaction product may flow into the second chemical reactor 250.

The second chemical reactor 250 may be in thermal communication with the thermal energy for sequestration, shown as a heat stream 255. The thermal piping for the thermal energy for sequestration 160 may be divided by a heat divider 265 to split the thermal energy flowing from the nuclear reactor 105 into two or more heat streams 255, 260. The heat divider 265 may include valves, piping, actuators, and electrical/electromechanical controls, as would be understood by a person of skill in the art, for splitting the thermal energy 160 into a thermal energy feed 255 for the second chemical reactor 250 and a thermal energy feed 260 for a third chemical reactor 275. While FIG. 2 shows the carbon dioxide sequestration system 165 as including the optional heat divider 265 to separate the thermal energy flow 160 between the second chemical reactor 250 and the third chemical reactor 275, it is also contemplated that, alternatively, the division of the thermal energy flow 160 may be located outside of the carbon dioxide sequestration system 165, such as through a piping and valve arrangement of the heat controller 115, to divide the usable thermal energy 110 into at least three heat paths. In this manner, the division of thermal energy streams into the second chemical reactor 250 and the third chemical reactor 275 may take place within or outside of the nuclear plant exclusion zone, as would be understood by a person of skill in the art.

The second chemical reactor 250 may include thermally insulated walls to retain heat within the second chemical reactor 250 and may include outputs for the removal of non-carbon residuals 270 after the heat from thermal energy feed 255 has broken down the sequestration reaction product into carbon containing and non-carbon containing components (e.g. non-carbon residuals 270) that may be removed. In some embodiments, the non-carbon residuals may be reacted with water, such as in a hydrator 254, and be reformed into the sequestration feedstock which flows back to the sequestration feedstock supply 245. In some embodiments, hydration of the non-carbon residual may be performed in the sequestration feedstock supply tank 245.

Optionally, the second chemical reactor 250 may have a thermocatalyst 252 and/or a substrate 253 disposed within. The thermocatalyst 252 and the substrate 253 may be selected to facilitate breaking the chemical bonds of the sequestration reaction product to yield the non-carbon residual and the carbon containing components, within the second chemical reactor 250. In some embodiments, the thermocatalyst 252 may be disposed as a coating on the surface of the substrate 253. When disposed as a coating, the thermocatalyst 252 may cover some or all of the surface of the substrate 253. The second chemical reactor 250 may be in fluid communication with the third chemical reactor 275 such that the carbon containing components may flow from the second chemical reactor 250 to the third chemical reactor 275. The carbon containing components may include carbon dioxide and/or carbon monoxide.

The third chemical reactor 275 may be thermally connected to the thermal energy feed 260 and in fluid communication with a product feedstock supply 280. The third chemical reactor 275 may include thermally insulated walls to prevent heat loss during operation. Optionally, the third chemical reactor 275 may have one or more of a thermocatalyst 285 and a substrate 290 disposed within. Both the thermocatalyst 285 and the substrate 290 may be used to enhance the reaction between the carbon containing components and the product feedstock that are driven by the thermal energy 260 flowing into the third chemical reactor 275. In some embodiments, the thermocatalyst 285 may be disposed as a coating on the surface of the substrate 290. When disposed as a coating, the thermocatalyst 285 may cover some or all of the surface of the substrate 290. The thermocatalyst 252 and the thermocatalyst 285 may include one or more of the same catalysts or each may include exclusive catalysts. The substrate 253 and the substrate 290 may include one or more of the same substrates or each may include exclusive substrates. The third chemical reactor 275 may also be in communication with a sequestered product storage container or line 295, such that the sequestered product may be removed from the third chemical reactor 275. In some embodiments, the third chemical reactor 275 may be coupled to an ultraviolet source 297 configured for destabilizing the carbon-oxygen bonds of the carbon containing components, typically carbon dioxide and/or carbon monoxide within or entering the third chemical reactor.

While the chemical reactors 230, 250, 275 are shown as individual chemical reactors in FIG. 2, it is contemplated that two or all of the chemical reactors 230, 250, 275 may be separate chambers grouped in one or two structures. In some embodiments, it is possible that the thermal source 105 could be an existing type of nuclear reactor, with thermal energy outputs below 600 degrees Celsius. In these instances, the available temperature outputs may dictate the type or production rate of the carbon products produced, as would be understood by persons of skill in the art.

Figure 3A:
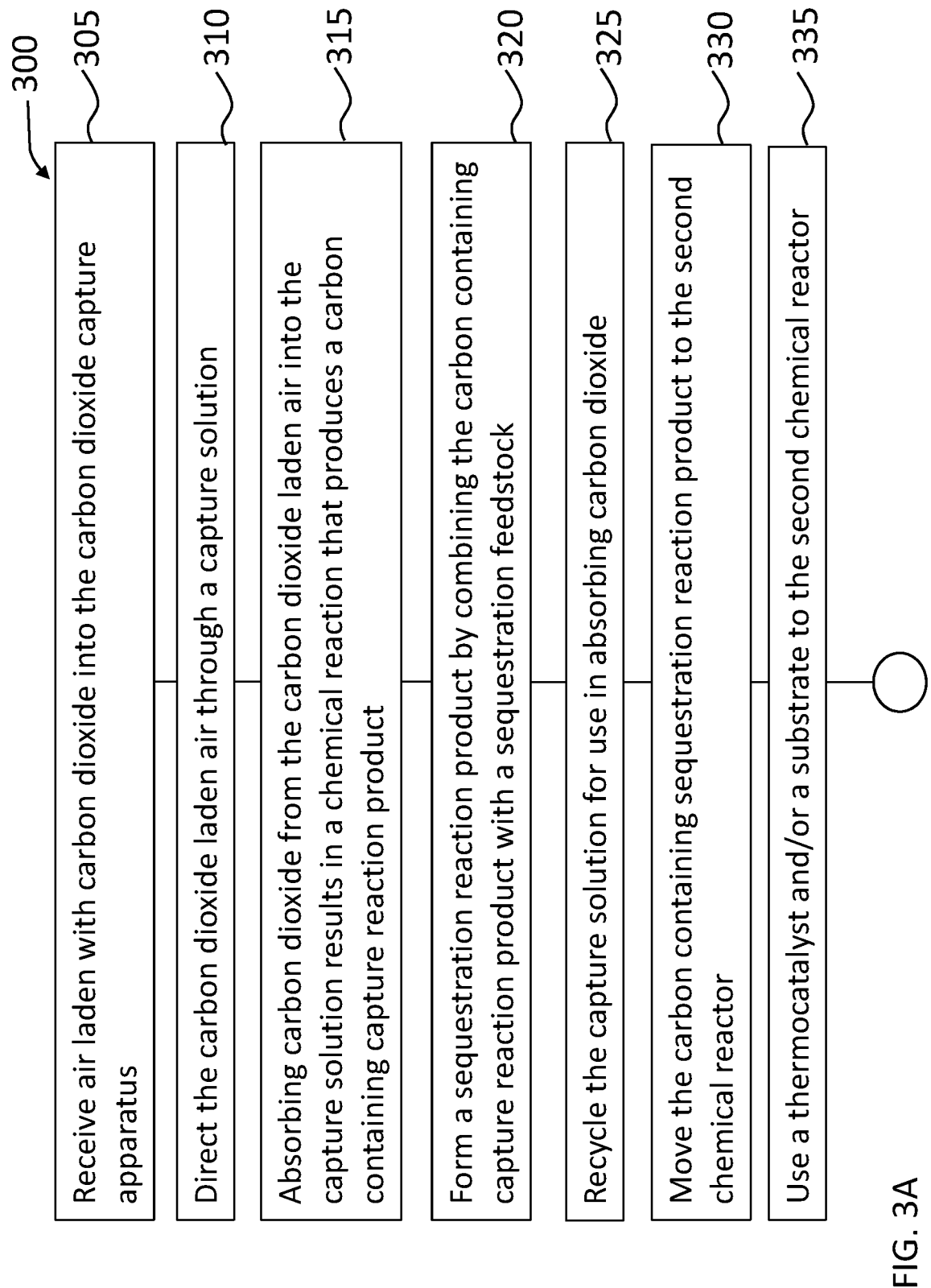
FIG. 3A is a first part of a flow chart of a method for capturing atmospheric carbon dioxide and synthesizing a carbon-based product using the captured carbon according to one embodiment of the present disclosure.
Figure 3B:
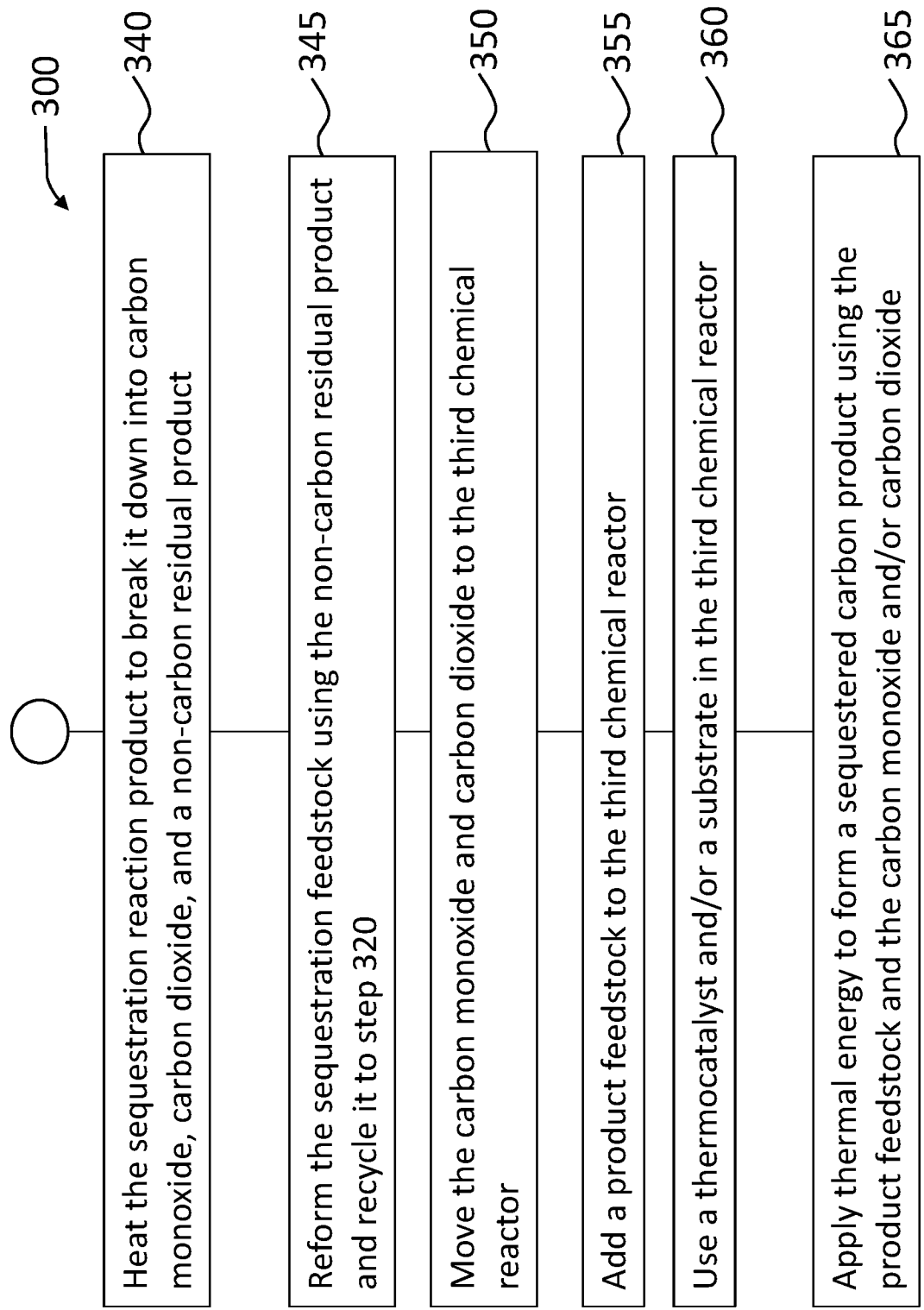
FIG. 3B is a second part of a flow chart of a method for capturing atmospheric carbon dioxide and synthesizing a carbon-based product using the captured carbon according to one embodiment of the present disclosure.

FIGS. 3A-3B show a flow chart of a method 300 for synthesizing a sequestered carbon material according to one embodiment of the present disclosure. In step 305, air laden with carbon dioxide may be directed or drawn into the carbon dioxide capture apparatus 205. The air may be moved into the carbon dioxide capture apparatus 205 passively or actively, such as using the fans 210 and/or the pumps 220. In step 310, the carbon dioxide-laden air passes across the interior of the carbon dioxide capture apparatus 205, where the capture solution, such as sodium hydroxide (NaOH), interfaces with the carbon dioxide in the incoming air stream. In step 315, the carbon dioxide in the air may chemically react with the capture solution to form a reaction product containing the carbon. One exemplary and non-limiting, chemical reaction for a capture solution with carbon dioxide is $2NaOH+CO_2 \rightarrow Na_2CO_3+H_2O$, where the carbon containing reaction product is sodium carbonate ($Na_2CO_3$). After this reaction, air exiting the carbon dioxide capture apparatus 205 will contain a reduced amount of carbon dioxide and may carry some of the water vapor produced during the carbon dioxide capture with it back to the atmosphere.

In step 320, the carbon containing reaction product may be combined with a sequestration feedstock (from the sequestration feedstock supply 245) in the first chemical reactor 230 to produce a carbon containing sequestration reaction product while restoring the capture solution so that the capture solution may be recycled. The sequestration feedstock 245 may be selected based on the properties of: 1) forming a carbon containing sequestration reaction product when combined with the carbon containing reaction product and 2) liberating carbon dioxide or carbon monoxide when heated sufficiently. One exemplary, and non-limiting, chemical reaction for forming the sequestration reaction product is $Na_2CO_3+Ca(OH)_2 \rightarrow 2NaOH+CaCO_3$, where calcium hydroxide ($Na_2CO_3$) is the carbon containing reaction product and calcium hydroxide is the sequestration feedstock 245. In step 325, the capture solution may be recycled to the carbon dioxide capture apparatus 205 for reuse.

In step 330, the sequestration reaction product may be transported into the second chemical reactor 250. In some embodiments, calcium carbonate ($CaCO_3$) is the sequestration reaction product. Alternatively, some of the sequestration reaction product may be buried or otherwise removed from the process, since the carbon has been sequestered from the atmosphere. In step 335, a thermocatalyst 252 and/or a substrate 253 may be added to the second chemical reactor 250. The thermocatalyst 252 may be homogeneous or heterogeneous; such as a metal, a multi-metal catalyst complex, a metal oxide, an aluminosilicate, or a liquid metal. The thermocatalyst may include one or more of: platinum, copper, rubidium, gold, titanium, ruthenium, or other metals processed to increase the surface area to minimize coking. The substrate 253 may include, but is not limited to, one of more of: single atoms of nickel, cobalt, and iron supported on carbon nanotubes, liquid metal with cerium nanoparticles, Ru-Macho-BH, palladium, or palladium to copper nanoparticles. In step 340, thermal energy from thermal energy flow 255 may be applied to the sequestration reaction product. The thermal energy may cause the second chemical reactor 250 to operate at a temperature sufficient to cause the chemical bonds of the sequestration reaction product to break, thus separating into a non-carbon residual and carbon containing component(s), such as one or both of carbon dioxide and carbon monoxide. For example, $CaCO_3+heat \rightarrow CaO+CO_2$ or $2CaCO_3+heat \rightarrow 2CaO+2CO+O_2$. In some embodiments, the temperature in the second chemical reactor 250 may be a high temperature of 600 degrees Celsius or higher. In some embodiments, the exact temperature in the second chemical reactor 250 may depend on the temperature of the thermal energy flow 255. In step 345, the non-carbon residual product may be reformed into the sequestration feedstock 245. For example, $CaO+H_2O \rightarrow Ca(OH)_2$.

In step 350, the carbon dioxide and/or carbon monoxide may be directed into the third chemical reactor 275. In some embodiments, the carbon dioxide and/or carbon monoxide may have their carbon-oxygen bonds destabilized by exposure to ultraviolet light either before entry to or within the third chemical reactor 275. In step 355, a product feedstock may be added to the third chemical reactor 275. In some embodiments, the product feedstock may be silicon dioxide. In other embodiments the product feedstock may be hydrogen or a hydrogen containing compound. In some embodiments, where the sequestered product is a form of carbon or other carbonaceous material, a product feedstock may be optional.

In step 360, a thermocatalyst 285 and/or a substrate 290 may be added to the third chemical reactor 275 to enhance the chemical reaction between the product feedstock (if needed) and the carbon dioxide/carbon monoxide. The thermocatalyst may be homogeneous or heterogeneous; such as a metal, a multi-metal catalyst complex, a metal oxide, an aluminosilicate, or a liquid metal. The thermocatalyst may include one or more of: platinum, copper, rubidium, gold, titanium, ruthenium, or other metals processed to increase the surface area to minimize coking. The substrate may include, but is not limited to, one of more of: single atoms of nickel, cobalt, and iron supported on carbon nanotubes, liquid metal with cerium nanoparticles, Ru-Macho-BH, palladium, or palladium to copper nanoparticles. The thermocatalyst 252 and the thermocatalyst 285 may contain thermocatalysts that are chemically the same or different. The substrate 253 and the substrate 290 may contain substrates that are chemically the same or different.

In some embodiments, step 360 may include two or more thermocatalysts with different functions as would be understood by a person of skill in the art. For example, one thermocatalyst may be selected to facilitate breaking the chemical bonds between carbon and oxygen, another thermocatalyst may be selected to facilitate the breaking of chemical bonds of the product feedstock, and still another thermocatalyst may be selected facilitate the synthesis of the liberated carbon and at least one element from the product feedstock to form the sequestered product. In some embodiments, step 360 may be optional. In some embodiments, steps 350-360 may be performed in any order.

In step 365, the carbon dioxide and/or carbon monoxide may be combined and heated with a product feedstock to synthesize a sequestered carbon product. For example, $CO_2+SiO_2+heat \rightarrow SiC+2O_2$ or $2CO+2SiO_2+heat \rightarrow 2SiC+3O_2$. In some embodiments, the product feedstock may be ground or introduced in a fine particulate form to maximize its reactive surface area. The heating may be provided by the thermal energy from thermal energy flow 260. The temperature in the third chemical reactor 275 may depend on the temperature of the thermal energy flow 260. In some embodiments, heating of the third chemical reactor 275 may cause it to reach temperatures of 600 degrees Celsius or higher.

Step 365 is not limited to the formation of a specific substance, e.g. silicon carbide, but may be used to form any number of substances known to a person of skill in the art, including, but not limited to, carbides, methanol, alcohols, other hydrocarbons and various carbonaceous materials. In some embodiments, the selections of one or more of the thermocatalyst, the substrate, and the product feedstock may depend on the temperature of the thermal energy 260. In some embodiments, one or more of the type, rate of production, and quality of the sequestered carbon product may depend on the temperature of the thermal energy 260.

While the above method 300 and the carbon dioxide sequestration system 165 show multiple chemical reactors for performing the steps of the method 300, it is also contemplated that two chemical reactors or even a single chemical reactor may be used by performing the steps of the method 300 in shifts. The operating temperatures of the second chemical reactor 250 and the third chemical reactor 275 may be the same or different depending on the temperatures required for their respective operations, as would be understood by a person of skill in the art.

In some embodiments, outputs from each of the chemical reactors 230, 250, 275 may produce useful chemical products that have commercial value. As discussed in the non-limiting example above, the use of captured carbon dioxide, calcium hydroxide and silicon dioxide as feedstocks 245, 280 may result in outputs of calcium carbonate from the first chemical reactor 230, carbon oxides from the second chemical reactor 250, and silicon carbide from the third chemical reactor 275. By regulating the method 300, the amounts of each output can be controlled and allocated either to advancing the subsequent reactions or being removed for independent usage of the output.

Figure 4:
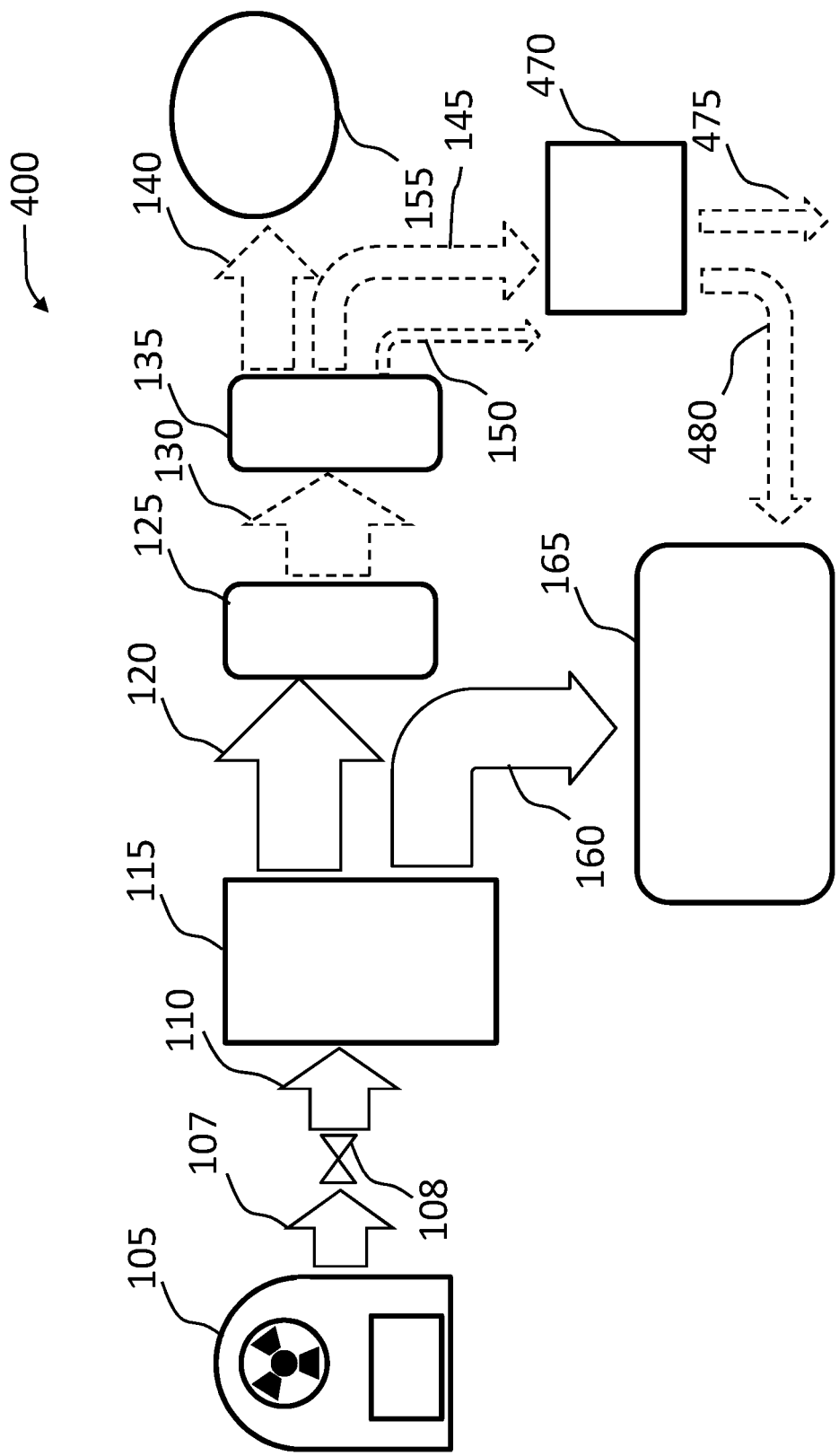
FIG. 4 is a diagram of a nuclear driven carbon dioxide sequestration system using operating reserve to augment the sequestration system according to another embodiment of the present disclosure.

FIG. 4 shows a diagram of another embodiment of a carbon dioxide sequestration system 400 according to the present disclosure. The system 400 includes the system 100 and additional features to use operating reserve electricity to electrically supplement the heat in the carbon dioxide sequestration system 165. In the system 400, the operating reserve 145 is directed to a reserve controller 470 configured to divert at least a part 480 of the operating reserve 145 to the sequestration system 165. As demand load 140 fluctuates or an upset condition occurs, the operating reserve 145 will fluctuate inversely to the demand load 140 (since the house load 150 may be fairly small and stable). By diverting the part 480 of the operating reserve 145 to the sequestration process, the amount of electricity dumped to ground 475 may be reduced, resulting in a more effective usage of electricity. It is notable that the carbon dioxide sequestration system 165 may already receive operating electricity (for controls, monitoring, etc.), but not necessarily electricity for supplemental heating, from the house load 150. The operating reserve electricity 145 (also called the spinning reserve) can be zero or some electricity can be either sent to the carbon dioxide sequestration system 165 or dumped to ground. Operating reserve electricity 145 sent to the reserve controller 470 by the electrical controller 135 could be used to raise the temperature of the fluid in the carbon dioxide sequestration system 165 by the electricity 480, from the reserve controller 470, to produce high end carbon containing products, or to improve the quality and production rate of sequestration products.

Figure 5:
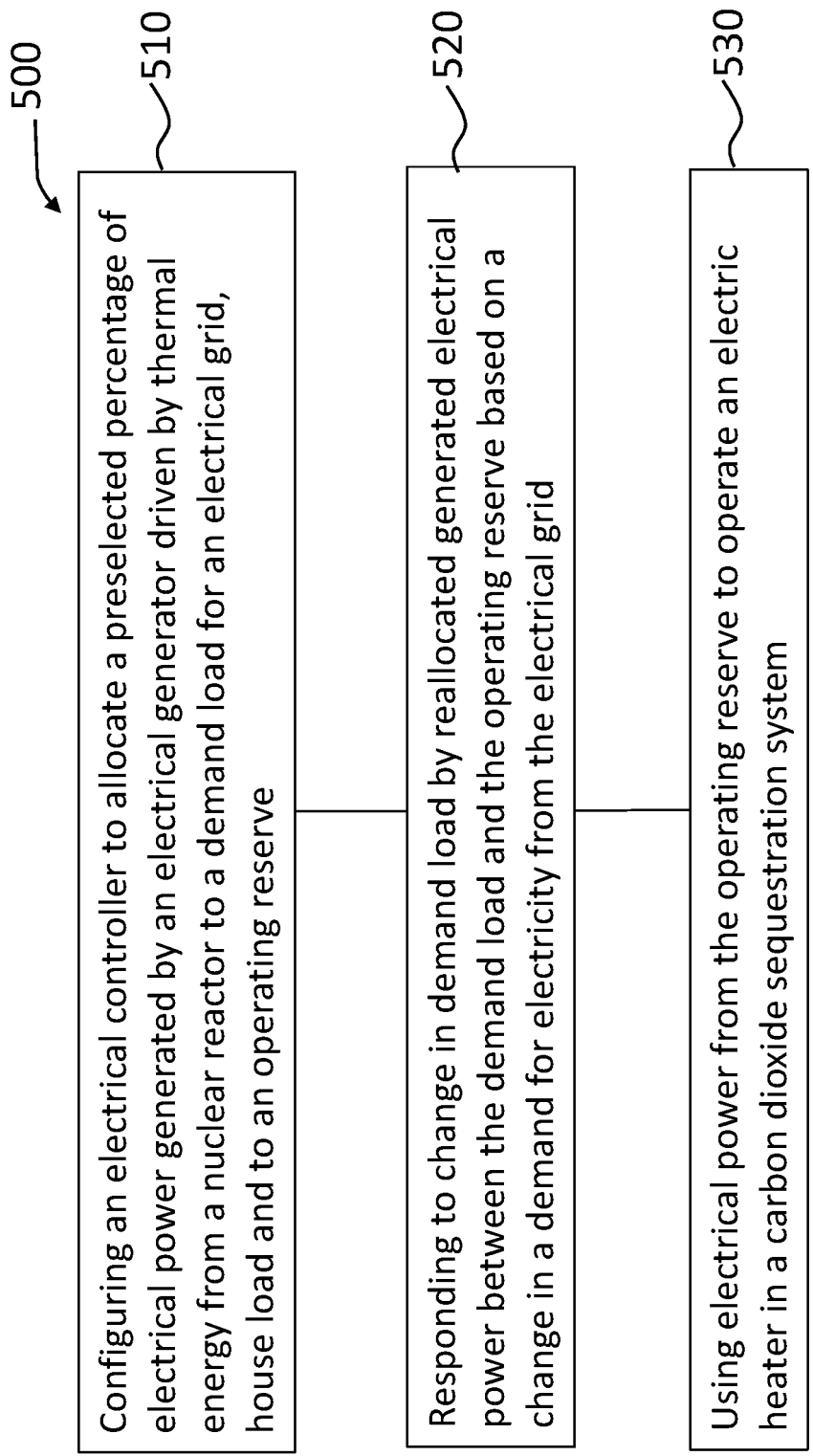
FIG. 5 is a flow chart of a method for managing electrical load in the nuclear driven carbon dioxide sequestration system of FIG. 4 according to one embodiment of the present disclosure.

FIG. 5 shows a flow chart of a method 500 for diverting some portion of the electricity to the sequestration system 165 and fine tuning the load control process with a fast response capability by modulating the electrical power diverted from the grid load. The method 500 may be performed using the system 400. In step 510, the electrical controller 135 may be configured to output a small preselected percentage of the generator output 130, to the operating reserve 145. In some embodiments, the small preselected percentage may be one percent or less of the generator output 130. The house load 150 and the demand load 140 are determined by the usage and are not under the control of the electrical controller 135. In step 520, the electrical controller 135 reallocates electrical power between the operating reserve 145 and the demand load 140 in response to a change in the demand load 140. The electrical controller 135 may allocate electricity for the reserve controller 470 and provide a fast response fine adjustment so that the electrical controller 135 output matches the electrical generator 125 output. Any adjustment made by the electrical controller 135 may be transmitted to the heat controller 115, which is the load follow device. An increase in electricity sent to the operating reserves 145 indicates that the overall electricity demand has decreased so a signal would be sent to the heat controller 115 to proportionally increase the heat to sequestration 160. The electrical controller 135 would then respond by proportionally decreasing the electricity sent to the operating reserves 145. If the electricity sent to operating reserves 145 decreased the process would be reversed. In some embodiments, the operating reserve 145 may be selected based on minimum or demand load 140 fluctuations expected from the electrical grid 155. In step 530, the reserve controller 470 allocates a portion 480 of the operating reserve 145 to one or more electrical heaters in the carbon dioxide sequestration system 165. In this manner, part or all of the operating reserve 145 may be used for the carbon dioxide sequestration 165 rather than dumped to ground 475. Also, the electrical controller 135 may reallocate electrical power between operating reserve 145 and demand load 140 more quickly than thermal energy may be reallocated by the heat controller 115. The nuclear power plant valves 108 between the thermal source and the heat controller 115 would receive a load demand signal from the electrical generator 125. To avoid any significant changes in the heat output 107 from the nuclear reactor 105 the demand signal may be provided by the heat controller 115 and include a dead band so that a constant full power demand signal is transmitted to the plant valve while the actual demand is within the dead band. The electrical controller 135 may continue to reallocate power that would not correspond to enough heat to exceed the dead band on the demand signal of the heat controller 115.

While embodiments in the present disclosure have been described in some detail, according to the preferred embodiments illustrated above, it is not meant to be limiting to modifications such as would be obvious to those skilled in the art.

The foregoing disclosure and description of the disclosure are illustrative and explanatory thereof, and various changes in the details of the illustrated apparatus and system, and the construction and the method of operation may be made without departing from the spirit of the disclosure.

What is claimed is:

1. A carbon sequestration system comprising:
   a thermal source;
   a heat controller thermally coupled to the thermal source;
   a heat driven electrical generator coupled to the heat controller; and
   a carbon dioxide sequestration system coupled to the heat controller, where the heat controller allocates energy from the thermal source between the heat driven electrical generator and the carbon dioxide sequestration system.

2. The system of claim 1, wherein the carbon dioxide sequestration system comprises:
   a carbon dioxide capture apparatus;
   a circulation loop for moving a capture solution that is in fluid communication with the carbon dioxide capture apparatus;
   a first chemical reactor in fluid communication with the circulation loop;
   a sequestration feedstock supply in fluid communication with the first chemical reactor;
   a second chemical reactor in fluid communication with the first chemical reactor;
   a first set of thermal energy piping configured to transport thermal energy from the heat controller to the second chemical reactor;
   a residual tank connected to the second chemical reactor;
   a third chemical reactor in fluid communication with the second chemical reactor;
   a product feedstock tank in fluid communication with the third chemical reactor; and
   a second set of thermal energy piping configured to transport thermal energy from the heat controller to the third chemical reactor.

3. The system of claim 2, wherein the capture solution is selected to react with carbon dioxide and produce a capture reaction product that comprises carbon from the carbon dioxide.

4. The system of claim 3, wherein the capture solution is sodium hydroxide.

5. The system of claim 2, wherein the sequestration feedstock supply comprises calcium hydroxide.

6. The system of claim 2, wherein the product feedstock supply comprises silicon dioxide.

7. The system of claim 2, further comprising:
   one or more thermocatalyst supplies in fluid communication with at least one of the second chemical reactor and the third chemical reactor.

8. The system of claim 7 wherein the one or more thermocatalyst supplies each comprises at least one of: a metal, a multi-metal catalyst complex, a metal oxide, an aluminosilicate, and a liquid metal.

9. The system of claim 7, wherein the one or more thermocatalyst supplies each comprises one or more of: platinum, copper, rubidium, gold, titanium and ruthenium.

10. The system of claim 2, further comprising:
one or more substrate supplies connected to at least one of the second chemical reactor and the third chemical reactor.

11. The system of claim 10, wherein the one or more substrate supplies each comprises one of more of: single atoms of nickel, cobalt and iron supported on carbon nanotubes, liquid metal with cerium nanoparticles, Ru-Macho-BH, palladium, or palladium to copper nanoparticles.

12. The system of claim 2, further comprising:
an ultraviolet light source connected to the third chemical reactor.

13. The system of claim 2, further comprising:
a makeup capture solution supply connected to the first chemical reactor.

14. The system of claim 2, further comprising:
a heat divider apparatus disposed between the heat controller, the first set of thermal energy piping, and the second set of thermal energy piping, wherein the heat divider is configured to allocate the thermal energy from the heat controller between the first set of thermal energy piping and the second set of thermal energy piping.

15. The system of claim 2, further comprising:
at least one fan or pump configured to move atmospheric air into the carbon dioxide capture apparatus.

16. The system of claim 1, wherein the electrical generator has an output and is in electrical communication with an electric grid and further comprising:
an electrical controller electrically coupled to the electrical generator and configured to provide electricity demand feedback to the heat controller, wherein the heat controller is configured to allocate the thermal energy from the thermal source based, at least in part, on the electricity demand feedback.

17. The system of claim 2, wherein the electrical generator has an output and is in electrical communication with an electric grid and further comprising:
an electrical controller electrically coupled to the electrical generator and configured to allocate a portion of the output to an operation reserve and to provide information on the demand load to the heat controller, wherein the heat controller is configured to allocate the thermal energy from the thermal source based, at least in part, on the demand load; and
a reserve controller configured to divert at least a portion of the operating reserve to at least one electric heater in the carbon dioxide sequestration system, wherein the at least one electric heater is in thermal communication with at least one of the second chemical reactor and the third chemical reactor.

18. The system of claim 1, wherein the thermal source is a nuclear reactor.

19. The system of claim 1, further comprising:
a plant valve disposed between the thermal source and the heat controller and configured to regulate thermal energy into the heat controller.

20. The system of claim 1, wherein the thermal source is configured to output the thermal energy at a temperature of at least 600 degrees Celsius.

21. The system of claim 20, wherein the thermal source is configured to output the thermal energy at a temperature of at least 800 degrees Celsius.

* * * * *